June 22, 1943.  W. A. BEDFORD, JR  2,322,614
SHIFTABLE SOCKET FASTENING DEVICE
Filed Oct. 16, 1942
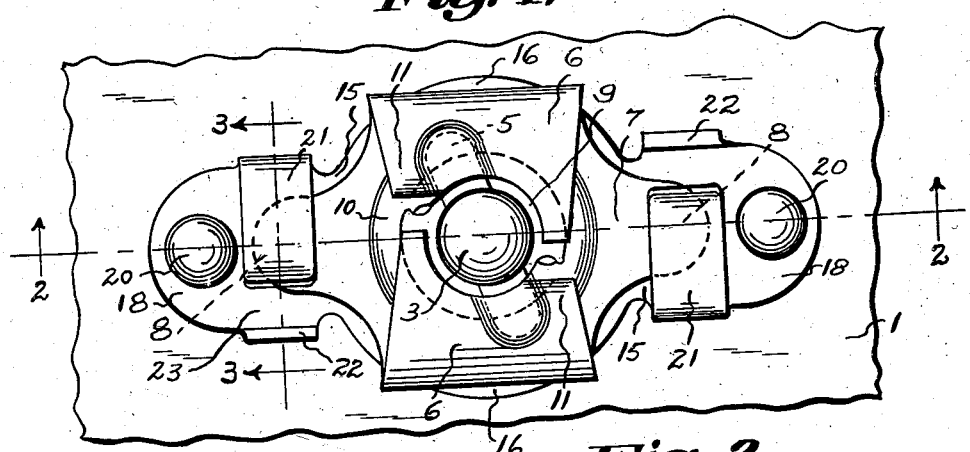
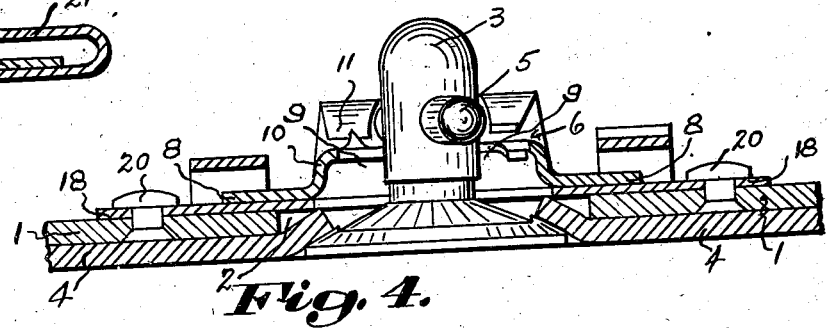
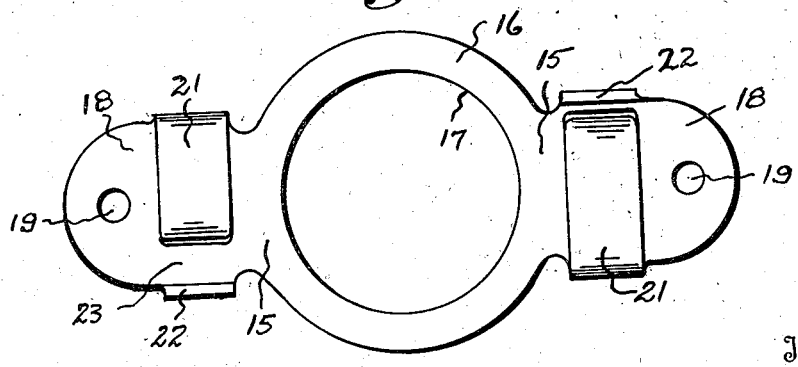
Inventor
William A. Bedford, Jr.
By Walter S. Jones
Attorney Patented June 22, 1943

2,322,614

UNITED STATES PATENT OFFICE 2,322,614

SHIFTABLE SOCKET FASTENING DEVICE

William A. Bedford, Jr., Hingham, Mass., assignor to United-Carr Fastener Corporation, Cambridge, Mass., a corporation of Massachusetts Application October 16, 1942, Serial No. 462,264

10 Claims. (Cl. 24—221)

The present invention relates to improvements in fasteners of the rotary stud type, such as those for locking cowling and like sheets together and aims to improve generally the construction of a shiftable socket fastener member thereof.

One of the primary objects of the invention is the provision of an improved mounting or attaching member for shiftably attaching the socket fastening member to an apertured cowling sheet or other support.

A further object of the invention is the provision of an attaching member that may be attached to the cowling sheet or support prior to assembly, permitting the socket member to be snapped into position in the attaching member later as the parts of the fastening installation are assembled.

Further aims and objects of the invention will appear from the following description, reference being made to the accompanying drawing wherein a preferred embodiment of the invention is illustrated.

In the drawing:

Fig. 1 is a plan view of a fastener secured installation as viewed from the female fastener side thereof;

Fig. 2 is a longitudinal central sectional view thereof as taken on the line 2—2 of Fig. 1;

Fig. 3 is a transverse sectional view as taken on the line 3—3 of Fig. 1; and

Fig. 4 is a plan view of the improved attaching member per se, also showing one of the holding loops longer than the other.

Referring to the drawing, the invention is illustrated as applied to a conventional type of rotary stud fastener installation commonly used for connecting together cowling and like sheets of aircraft bodies embodying a support 1 formed with an aperture 2 for receiving a stud member 3 rotatably mounted in a part 4 to be attached to the support 1. The stud 3 conveniently is provided with radial arms or projections 5 adapted to engage and interlock with a cam or like seat of a female fastener member or socket device 6 attached to the support 1 upon turning movement of the stud, as will be readily understood.

The female fastener member or socket device may be of any of the approved forms of sheet metal devices commonly used as socket members of cowling fasteners. Preferably the member 6 is of the type shown in my copending application Serial No. 420,554, filed November 26, 1941. Advantageously it is formed of a single piece of metal having a base portion 7, preferably elongated to provide spaced bearing sections 8 at the ends and an intermediate stud-receiving aperture 9. Portions of the base surrounding the aperture 9 are dished outwardly providing a raised cam seat or embossment 10 adapted to be engaged by the arms 5 of the stud 3 when the latter is rotated a partial revolution. The female member or socket device may also be provided with integral locking means 11 overlying the cam seat 10, as disclosed in my prior application above mentioned.

According to the invention, the female or socket member 6 is loosely and shiftably attached to the support 1 by means of an attaching or retainer member in such a way as to permit lateral shifting of the member 6 relative to the support aperture 2 so as to effect ready alignment between the member 6 and the stud 3 on the part 4 to be attached to the support.

The attaching member comprises a plate member 15 which may advantageously be formed with a central enlargement 16 and apertured as at 17 to overlie the aperture 2 of the support 1. The plate member 15 is formed with extensions 18 apertured as at 19 to receive fastening elements 20, such as rivets and the like, by means of which the attaching member may be securely fastened to the support 1.

The attaching member is provided with a plurality of retaining loops to overlie portions of the socket member, preferably the bearing sections 8, which extend laterally from the socket 6. Preferably these loops are gapped or non-continuous and extend transversely of the attaching member intermediate the aperture 17 and fastening apertures 19.

The loops may be formed by an integral tongue 21 extending upwardly from one side of the plate and extending across it in spaced relation thereto for a distance close to but short of the opposite side edges thereof. The opposite side of the loop may be formed by a single integral upstanding tongue 22 spaced from the free end of the tongue 21 so as to form an entering throat 23 for the bearing extensions 8 of the socket member. Preferably the terminal end of the tongue 21 is outwardly flared to facilitate entering the bearing sections 8 in the throat 23.

The throats 23 of the respective loops are preferably arranged on opposite sides of the plates to prevent dislodgment of the socket from the attaching member by a force applied thereto in any single direction.

As will be apparent, the width and depth of the loops is greater than the width and thickness of the bearing extensions 8 of the socket, so that the latter are shiftable transversely therein. Also the spacing between the loops, longitudinally of the plate 15, is greater than the distance between the central portions of the bearing sections, permitting the socket to be shiftable longitudinally of the attaching plate. This provides a shiftable and floating mounting for the socket, facilitating self-alignment of the socket member with the stud member 3 on assembly of the parts of the installation.

In practice the attaching member 15 may be secured to the support 1 at the time the support is punched or fabricated to form the stud-receiving aperture 2. Later, as for example during assembly, the socket member may be inserted in the attaching member by inserting one bearing extension 8 in one of the loops and forcing the opposite extension laterally into the open throat of the other loop. As the tongue 21 is resilient and the throat 23 is of less width than the extensions 8, the latter are forced into the loop with a snap fastener action.

It will be apparent from the above that both of the loops need not be formed with an open throat and one of these may be wholly or substantially closed as indicated at the right-hand side of Fig. 4.

While I have illustrated and described a preferred embodiment of my invention I do not wish to be limited thereby because the scope of my invention is best defined by the following claims.

I claim:

1. In a rotary operative fastener of the type comprising a rotary stud formed with a radially extending arm and a socket member attached to an apertured support and adapted to interlock therewith upon turning movement of the stud, said socket member being formed with a plurality of lateral extensions, of an attaching member including a base adapted to be secured to said support, said attaching member being formed with portions for loosely receiving the extensions of said socket member, at least one of said portions having an open throat to permit an extension to be inserted therein after said attaching member has been secured to said support.

2. In a rotary operative fastener of the type comprising a rotary stud formed with a radially extending arm and a socket member attached to an apertured support and adapted to interlock therewith upon turning movement of the stud, said socket member being formed with a plurality of lateral extensions, of an attaching member including a base adapted to be secured to said support, said attaching member being formed with spaced loops for loosely receiving the extension of said socket member, at least one of said loops having an open throat adjacent one side thereof to permit the extension therefor to be inserted therein after said attaching member has been secured to said support.

3. In a rotary operative fastener of the type comprising a rotary stud formed with a radially extending arm and a socket member attached to an apertured support and adapted to interlock therewith upon turning movement of the stud, said socket member being formed with a plurality of lateral extensions, of an attaching member including a base adapted to be secured to said support, said attaching member being formed with spaced loops for loosely receiving the extensions of said socket member, at least one of said loops having an open throat in the upper surface thereof to permit the extension therefor to be inserted therein after said attaching member has been secured to said support.

4. In a rotary operative fastener of the type comprising a rotary stud formed with a radially extending arm and a socket member attached to an apertured support and adapted to interlock therewith upon turning movement of the stud, said socket member being formed with a plurality of lateral extensions, of an attaching member comprising an apertured base surrounding the aperture of the support and lateral extensions adapted to be secured to said support, said attaching member being formed with spaced loops for loosely receiving the extensions of said socket member, at least one of said loops having an open throat to permit the extensions therefor to be inserted therein after said attaching member has been secured to said support.

5. In a rotary operative fastener of the type comprising a rotary stud formed with a radially extending arm and a socket member attached to an apertured support and adapted to interlock therewith upon turning movement of the stud, said socket member being formed with a plurality of lateral extensions, of an attaching member comprising an apertured base surrounding the aperture of the support and lateral extensions adapted to be secured to said support, said extensions being formed with spaced loops for loosely receiving the extensions of said socket member, at least one of said loops having an open throat to permit the extensions therefor to be inserted therein after said attaching member has been secured to said support.

6. In a rotary operative fastener of the type comprising a rotary stud formed with a radially extending arm and a socket member attached to an apertured support and adapted to interlock therewith upon turning movement of the stud, said socket member being formed with a plurality of lateral extensions, of an attaching member comprising an apertured base surrounding the aperture of the support and lateral extensions adapted to be secured to said support, said extensions being formed with spaced loops for loosely receiving the extensions of said socket member, at least one of said loops being formed with an open throat of less width than the socket extension but of sufficient width to permit the latter to be snapped therein.

7. In a rotary operative fastener of the type comprising a rotary stud formed with a radially extending arm and a socket member attached to an apertured support and adapted to interlock therewith upon turning movement of the stud, said socket member being formed with a plurality of lateral extensions, of an attaching member comprising an apertured base surrounding the aperture of the support and lateral extensions adapted to be secured to said support, said extensions being formed with spaced loops for loosely receiving the extensions of said socket member, each of said loops being formed with an open throat of less width than the socket extension but of sufficient width to permit the latter to be snapped therein.

8. In a rotary operative fastener of the type comprising a rotary stud formed with a radially extending arm and a socket member attached to an apertured support and adapted to interlock therewith upon turning movement of the stud, said socket member being formed with a plurality of lateral extensions, of an attaching member comprising an apertured base surrounding the aperture of the support and lateral extensions adapted to be secured to said support, said extensions being formed with spaced loops for loosely receiving the extensions of said socket member, each of said loops being formed with an open throat of less width than the socket extension but of sufficient width to permit the latter to be snapped therein, the throats of the respective loops being disposed on opposite sides of said attaching member.

9. A socket fastener member for attachment to an apertured support comprising a stud-receiving socket having an elongated base formed with a stud-receiving aperture and a raised stud-engaging seat adjacent said aperture, the terminal end portions of said base being disposed in a plane spaced from the plane of said seat and constituting bearing sections, an attaching member for connecting said socket member to said support comprising an elongated plate supporting said socket and having its terminal ends beyond said bearing sections fixedly attached to said support, said plate providing a supporting surface for said bearing portions and being formed with an intermediate aperture overlying said support aperture and transversely disposed loop means on said plate ends overlying said bearing portions, said socket member being bodily shiftable upon said attaching member.

10. A socket fastener member for attachment to an apertured support comprising a stud-receiving socket having an elongated base formed with a stud-receiving aperture and a raised stud-engaging seat adjacent said aperture, the terminal end portions of said base being disposed in a plane spaced from the plane of said seat and constituting bearing sections, an attaching member for connecting said socket member to said support comprising an elongated plate supporting said socket and having its terminal ends beyond said bearing sections fixedly attached to said support, said plate providing a supporting surface for said bearing portions and being formed with an intermediate aperture overlying said support aperture and transversely disposed loop means on said plate ends overlying said bearing portions, said socket member being bodily shiftable upon said attaching member, at least one of said loops being formed with an open throat to permit a bearing section of said socket to be inserted laterally into said loop.

WILLIAM A. BEDFORD, Jr.

DISCLAIMER 2,322,614.—*William A. Bedford, Jr.*, Hingham, Mass. SHIFTABLE SOCKET FASTENING DEVICE. Patent dated June 22, 1943. Disclaimer filed August 10, 1943, by the assignee, *United-Carr Fastener Corporation*.

Hereby enters this disclaimer to claim 9 in said specification.

[*Official Gazette August 31, 1943.*]